United States Patent
Shridhar et al.

(10) Patent No.: US 8,898,200 B2
(45) Date of Patent: Nov. 25, 2014

(54) INSIGHT GENERATION FROM STATISTICAL MEASURE/DIMENSION COMBINATIONS

(71) Applicant: SAP AG, Walldorf (DE)

(72) Inventors: Archana Shridhar, Bangalore (IN); Ekantheshwara Basappa, Bangalore (IN); Ganesh Vaitheeswaran, Bangalore (IN); Shiva Prasad Nayak, Bangalore (IN)

(73) Assignee: SAP AG, Walldorf (DE)

( * ) Notice: Subject to any disclaimer, the term of this patent is extended or adjusted under 35 U.S.C. 154(b) by 207 days.

(21) Appl. No.: 13/692,680

(22) Filed: Dec. 3, 2012

(65) Prior Publication Data

US 2014/0156639 A1 Jun. 5, 2014

(51) Int. Cl.
*G06F 17/30* (2006.01)
(52) U.S. Cl.
CPC ............................. *G06F 17/30991* (2013.01)
USPC .......................................... 707/802; 707/722
(58) Field of Classification Search
CPC .................. Y10S 707/99941; G06F 17/30991
USPC ................................................. 707/722, 802
See application file for complete search history.

(56) References Cited

U.S. PATENT DOCUMENTS 7,269,598 B2 * 9/2007 Marchisio .............................. 1/1
7,818,286 B2 * 10/2010 Chu et al. ....................... 707/600

OTHER PUBLICATIONS

John Appleby, Internet article entitled "Update III: The SAP HANA FAQ—answering key SAP In-Memory questions," May 28, 2012, Business Intelligence, Business Objects, HANA, In-Memory SAP NetWeaver Platform, Consumer Business. Retrieved from http://www.bluefinsolutions.com/insights/blog/the_sap_hana_faq_answering_key_sap_in_memory_questions/.
The Global Information Technology Report 2012, Chapter 1.7, "Harnassing the Power of Big Data in Real Time through In-Memory Technology and Analytics" SAP AG,pp. 89-96 2012 World Economic Forum.
Jean-Pierre Dijicks, "Oracle: Big Data for the Enterprise," An Oracle White Paper, Jan. 2012.
Dan Woods, "Understanding the Value of In-Memory Technology: A Comparative Approach," Forbes article dated Feb. 28, 2012.

* cited by examiner

*Primary Examiner* — Cheryl Lewis
(74) *Attorney, Agent, or Firm* — Fountainhead Law Group, PC

(57) ABSTRACT

Insights gleaned from statistical analysis of a dataset of an in-memory database, may be obtained with high throughput. In response to a user query, a Data Inference Engine (DIE) provides statistically valid measure/dimension combinations of the dataset to an analysis tool. A master procedure may be executed at search query runtime, allowing timely filtering of output of the analysis tool based on columns provided in the user request. Inputs/outputs of the master procedure may avoid storing physical tables, reducing maintenance. The master procedure may comprise individual sub-procedures (e.g. determining outliers, percentage contribution) executed in parallel. Output of sub-procedure(s) may be formatted per a final output format, facilitating union therebetween. Embodiments may filter certain measure/dimension combinations received from the DIE. For example, embodiments may consider only unique measure/dimension combinations (irrespective of dimension order), a limited number of combinations (e.g. ≤20), and/or combinations having a limited number of dimensions (e.g. ≤3).

20 Claims, 30 Drawing Sheets

```
var sCreateProcQry = "CREATE PROCEDURE \"" + sDykSchema + "\".\"" + sDykUser + "_" + sTable + "_DYKGEN\"(IN ss_id VARCHAR(1000), IN
req_id VARCHAR(1000),OUT op_data \"" + sDykSchema + "\".\"" + sDykUser + "_" + sTable + "_DYK_RESULT_TABLE\") LANGUAGE SQLSCRIPT READS SQL DATA WITH
RESULT VIEW \"" + sDykSchema + "\".\"" + sDykUser + "_" + sTable + "_DYKRESULTVIEW\" AS BEGIN";

//Seperate measure from Dimensions
var com_i;
var aMeasureList = [];
var aAggList = [];
var iM_count = 0;
var iD_count = 0;
var sResultQry = "";
var sResultQry1 = "";
var sResultQry2 = "";
var cnt = 1;
var count = 1;
var aunion_tab_list = [];

var sSchema_name = sDykUser;
var conn1 = oConn.fnGetConnection(0);

var qry1 = "SELECT TOP 1 SCHEMA_NAME,DATASET_NAME FROM \"" + sDykSchema + "\".\"" + sDykUser + "_DATASET_MASTER\" WHERE
UUID = '" + sTable + "'";
$.trace.fatal("qry is:" + qry1);
var pstmt1 = conn1.prepareStatement(qry1);
var oRs1 = pstmt1.executeQuery();
while (oRs1.next()) {
```

FIG. 3A

```
sSchema_name = oRs1.getString(1);
sTable = oRs1.getString(2);
//trace.fatal("sSchema_name is:"+sSchema_name);
}
var icombiList_length = allCombinationList.length;
oLog.fnDevTrace('DEBUG',"Length of combination array is: " + icombiList_length);
$.trace.fatal("Length of combination array is: " + icombiList_length);
if (icombiList_length > 20) {
    icombiList_length = 20;
}
//oLog.fnDevTrace('DEBUG',"Length of combination array is<After>: " + icombiList_length);
for (com_i = 0; com_i < icombiList_length; com_i++) {
    try { sCreateProcQry = sCreateProcQry + "\n in_data" + com_i + " = SELECT CAST('" + sAggrName + "('\"" + sMeasure_name + "\"') AS DOUBLE) as VALUE'," + sDimen + " FROM \"" + sSchema_name + "\".\"" + sTable + "\" GROUP BY " + sDimList + ";\n";

sCreateProcQry = sCreateProcQry + "cntrl_table" + com_i + " = SELECT DISPLAY_NAME AS COLUMN_NAME,COLUMN_OID FROM \"" + sDykSchema + "\".\"" + sDykUser + "_COLUMN_MASTER\" where COLUMN_NAME IN ('" + sColumnList1 + "') and TABLE_NAME='" + sTable + "' and SCHEMA_NAME = '" + sSchema_name + "' ORDER BY ANALYSIS_TYPE DESC, COLUMN_NAME;\n";

sCreateProcQry = sCreateProcQry + "CALL " + sDykSchema + ".DYK_BoxNWhisker(:in_data" + com_i + ", " + aDimensionList.length + ", :cntrl_table" + com_i + ", :op_outliers_tab" + com_i + ");\n";

sCreateProcQry = sCreateProcQry + "op_outliers" + com_i + " = SELECT * FROM :op_outliers_tab" + com_i + " WHERE COLUMN_OID IN(SELECT COLUMN_OID FROM \"" + sDykSchema + "\".\"" + sDykUser + "_DYK_SEARCH_CNTRL_TABLE\" WHERE SESSION_ID = :ss_id AND REQUEST_ID = :req_id);\n";
```

FIG. 3B

```
if (aDimensionList.length === 1) {
    sCreateProcQry = sCreateProcQry + " CALL " + sDykSchema + ".DYK_Percentile(:in_data" + com_i + ", " + aDimensionList.length +
", :cntrl_table" + com_i + ", :op_percnt_tab" + com_i + ");\n";
    sCreateProcQry = sCreateProcQry + " op_percnt" + com_i + " = SELECT * FROM :op_percnt_tab" + com_i + " WHERE COLUMN_OID
IN(SELECT COLUMN_OID FROM \"" + sDykSchema + "\".\"" + sDykUser + "_DYK_SEARCH_CNTRL_TABLE\" WHERE SESSION_ID = :ss_id AND
REQUEST_ID = :req_id);\n";

if (count > 1) {
        sResultQry2 = sResultQry2 + " UNION ALL";
    }
    sResultQry2 = sResultQry2 + "\n SELECT * from :op_percnt" + com_i + "\n";
    count++;
}
if (cnt > 1) {
    sResultQry1 = sResultQry1 + " UNION ALL";
}
sResultQry1 = sResultQry1 + "\n SELECT * from :op_outliers" + com_i + "\n";
cnt++;
} catch (calErr) {
    oLog.fnDevTrace('DEBUG', "error found :" + calErr);
}
oRs1.close();
```

FIG. 3C

```
pstmt1.close();
oConn.fnCloseConnection(conn1);
try {
    sCreateProcQry = sCreateProcQry + " op_data1 = '" + sResultQry1 + "';\n";
    if (sResultQry2 !="") {
        sCreateProcQry = sCreateProcQry + " op_data2 = '" + sResultQry2 + "';\n";
        sCreateProcQry = sCreateProcQry + " op_data_tmp = SELECT * FROM :op_data1 UNION ALL SELECT * FROM :op_data2;\n";
    } else {
        sCreateProcQry = sCreateProcQry + " op_data_tmp = SELECT * FROM :op_data1;\n";
    }
    sCreateProcQry = sCreateProcQry + " op_data = SELECT DYK_INSIGHT,COUNT(*)*SCORE AS FINAL_SCORE,COLUMN_ID as COLUMN_SPEC from :op_data_tmp GROUP BY COLUMN_ID,DYK_INSIGHT,SCORE;\n";
    sCreateProcQry = sCreateProcQry + "\n END;";
    //trace.fatal("query ::"+sCreateProcQry)
    oLog.fnDevTrace('DEBUG', "query ::'" + sCreateProcQry);
    var dykConn = oConn.fnGetConnection(0);
    var csPc = dykConn.prepareCall(sCreateProcQry);
    var iExecrc = csPc.execute();
    csPc.close();
    oConn.fnCommitConnection(dykConn);
    oConn.fnCloseConnection(dykConn);
```

FIG. 3D

```
CREATE PROCEDURE "PRAJNAA"."ARCH_4FBC704577EF8112E10000000A358198_DYKGEN"
    (IN ss_id VARCHAR
        (1000), IN req_id VARCHAR
        (1000),OUT op_data "PRAJNAA"."DYK_RESULT_TABLE"
    ) LANGUAGE SQLSCRIPT READS SQL DATA WITH RESULT VIEW
"PRAJNAA"."ARCH_4FBC704577EF8112E10000000A358198_DYKRESULTVIEW" AS
BEGIN
in_data1 = SELECT CAST(SUM("Revenue") AS DOUBLE) as VALUE,"Manager_Name" AS
DIM1,"Manager_Name" AS DIM2,"Manager_Name" AS DIM3 FROM
"ARCH"."4FBC704577EF8112E10000000A358198" GROUP BY "Manager_Name";
cntrl_table1 = SELECT DISPLAY_NAME AS COLUMN_NAME, COLUMN_OID FROM
"PRAJNAA"."ARCH_COLUMN_MASTER" where COLUMN_NAME IN ('Revenue','Manager_Name')
and TABLE_NAME='4FBC704577EF8112E10000000A358198' and SCHEMA_NAME = 'ARCH'
ORDER BY ANALYSIS_TYPE DESC, COLUMN_NAME;

CALL PRAJNAA.DYK_BoxNWhisker(:in_data1,1,:cntrl_table1,:op_outliers_tab1);
op_outliers1 = SELECT * FROM :op_outliers_tab1 WHERE COLUMN_OID IN(SELECT
        COLUMN_OID FROM "PRAJNAA"."ARCH_DYK_SEARCH_CNTRL_TABLE" WHERE
SESSION_ID = :ss_id AND REQUEST_ID = :req_id);

CALL PRAJNAA.DYK_Percentile(:in_data1,1,:cntrl_table1,:op_percnt_tab1);
op_percnt1 = SELECT * FROM :op_percnt_tab1 WHERE COLUMN_OID IN(SELECT
        COLUMN_OID FROM "PRAJNAA"."ARCH_DYK_SEARCH_CNTRL_TABLE" WHERE
SESSION_ID = :ss_id AND REQUEST_ID = :req_id);

in_data2 = SELECT CAST(SUM("Revenue") AS DOUBLE) as VALUE,"Loan_Cat" AS
DIM1,"Loan_Cat" AS DIM2,"Loan_Cat" AS DIM3 FROM
"ARCH"."4FBC704577EF8112E10000000A358198" GROUP BY "Loan_Cat";
cntrl_table2 = SELECT DISPLAY_NAME AS COLUMN_NAME, COLUMN_OID FROM
"PRAJNAA"."ARCH_COLUMN_MASTER" where COLUMN_NAME IN ('Revenue','Loan_Cat')
```

FIG. 4A

```
and TABLE_NAME='4FBC704577EF8112E10000000A358198'
and SCHEMA_NAME = 'ARCH' ORDER BY ANALYSIS_TYPE DESC, COLUMN_NAME;

CALL PRAJNAA.DYK_BoxNWhisker(:in_data2 ,1, :cntrl_table2, :op_outliers_tab2);
op_outliers2 = SELECT * FROM :op_outliers_tab2 WHERE COLUMN_OID IN(SELECT
    COLUMN_OID FROM "PRAJNAA"."ARCH_DYK_SEARCH_CNTRL_TABLE" WHERE
    SESSION_ID = :ss_id AND REQUEST_ID = :req_id);
op_percnt2 = SELECT *FROM :op_percnt_tab2 WHERE COLUMN_OID IN(SELECT
    COLUMN_OID FROM "PRAJNAA"."ARCH_DYK_SEARCH_CNTRL_TABLE" WHERE
    SESSION_ID = :ss_id AND REQUEST_ID = :req_id);

in_data3 = SELECT CAST(SUM("Revenue") ,"Loan_Type_Desc" AS
DIM1,"Loan_Type_Desc" AS DIM2,"Loan_Type_Desc" AS DIM3
FROM "ARCH"."4FBC704577EF8112E10000000A358198" GROUP BY "Loan_Type_Desc";
cntrl_table3 = SELECT DISPLAY_NAME AS COLUMN_NAME,COLUMN_OID FROM
"PRAJNAA"."ARCH_COLUMN_MASTER" where COLUMN_NAME IN
(Revenue', 'Loan_Type_Desc') and TABLE_NAME='4FBC704577EF8112E10000000A358198'
and SCHEMA_NAME = 'ARCH' ORDER BY ANALYSIS_TYPE DESC, COLUMN_NAME;

CALL PRAJNAA.DYK_BoxNWhisker(:in_data3 ,1, :cntrl_table3, :op_outliers_tab3);
op_outliers3 = SELECT * FROM :op_outliers_tab3 WHERE COLUMN_OID IN(SELECT
    COLUMN_OID FROM "PRAJNAA"."ARCH_DYK_SEARCH_CNTRL_TABLE" WHERE
    SESSION_ID = :ss_id AND REQUEST_ID = :req_id);

CALL PRAJNAA.DYK_Percentile(:in_data3 ,1, :cntrl_table3, :op_percnt_tab3);
op_percnt3 = SELECT * FROM :op_percnt_tab3 WHERE COLUMN_OID IN(SELECT
    COLUMN_OID FROM "PRAJNAA"."ARCH_DYK_SEARCH_CNTRL_TABLE" WHERE
    SESSION_ID = :ss_id AND REQUEST_ID = :req_id);
```

FIG. 4B

```
in_data4 = SELECT CAST(SUM("Revenue") ,"Sales_Stage") ,"Sales_Stage" AS
DIM2,"Sales_Stage" AS DIM3 FROM "ARCH"."4FBC704577EF8112E10000000A358198"
GROUP BY "Sales_Stage";
cntrl_table4 = SELECT DISPLAY_NAME AS COLUMN_NAME,COLUMN_OID FROM
"PRAJNAA"."ARCH_COLUMN_MASTER" where COLUMN_NAME IN ('Revenue','Sales_Stage')
and TABLE_NAME='4FBC704577EF8112E10000000A358198' and SCHEMA_NAME = 'ARCH'
ORDER BY ANALYSIS_TYPE DESC, COLUMN_NAME;

CALL PRAJNAA.DYK_BoxNWhisker(:in_data4 ,1, :cntrl_table4, :op_outliers_tab4);
op_outliers4 = SELECT * FROM :op_outliers_tab4 WHERE COLUMN_OID IN(SELECT
    COLUMN_OID FROM "PRAJNAA"."ARCH_DYK_SEARCH_CNTRL_TABLE" WHERE
SESSION_ID = :ss_id AND REQUEST_ID = :req_id);

CALL PRAJNAA.DYK_Percentile(:in_data4 ,1, :cntrl_table4, :op_percnt_tab4);
op_percnt4 = SELECT * FROM :op_percnt_tab4 WHERE COLUMN_OID IN(SELECT
    COLUMN_OID FROM "PRAJNAA"."ARCH_DYK_SEARCH_CNTRL_TABLE" WHERE
SESSION_ID = :ss_id AND REQUEST_ID = :req_id);

in_data5 = SELECT CAST(SUM("Revenue") ,"Close_Year_Est" AS
DIM1,"Close_Year_Est" AS DIM2,"Close_Year_Est" AS DIM3 FROM
"ARCH"."4FBC704577EF8112E10000000A358198" GROUP BY "Close_Year_Est";
cntrl_table5 = SELECT DISPLAY_NAME AS COLUMN_NAME,COLUMN_OID FROM
"PRAJNAA"."ARCH_COLUMN_MASTER" where COLUMN_NAME IN
('Revenue','Close_Year_Est') and
TABLE_NAME='4FBC704577EF8112E10000000A358198' and SCHEMA_NAME = 'ARCH'
ORDER BY ANALYSIS_TYPE DESC, COLUMN_NAME;

CALL PRAJNAA.DYK_BoxNWhisker(:in_data5 ,1, :cntrl_table5, :op_outliers_tab5);
op_outliers5 = SELECT * FROM :op_outliers_tab5 WHERE COLUMN_OID IN(SELECT
```

FIG. 4C

```
     COLUMN_OID FROM "PRAJNAA"."ARCH_DYK_SEARCH_CNTRL_TABLE" WHERE
SESSION_ID = :ss_id AND REQUEST_ID = :req_id);

CALL PRAJNAA.DYK_Percentile(:in_data5 ,1, :cntrl_table5, :op_percnt_tab5);
op_percnt5 = SELECT * FROM :op_percnt_tab5 WHERE COLUMN_OID IN(SELECT
     COLUMN_OID FROM "PRAJNAA"."ARCH_DYK_SEARCH_CNTRL_TABLE" WHERE
SESSION_ID = :ss_id AND REQUEST_ID = :req_id);

op_data1 = SELECT * from :op_outliers1 UNION ALL SELECT * from :op_outliers2
UNION ALL SELECT * from :op_outliers3 UNION ALL SELECT * from :op_outliers4
UNION ALL SELECT * from :op_outliers5 UNION ALL SELECT * from :op_outliers6;

op_data2 = SELECT * from :op_percnt1 UNION ALL SELECT * from :op_percnt2
UNION ALL SELECT * from :op_percnt3 UNION ALL SELECT * from :op_percnt4 UNION
ALL SELECT * from :op_percnt5 UNION ALL SELECT * from :op_percnt6;

op_data_tmp = SELECT * FROM :op_data1 UNION ALL SELECT * FROM :op_data2;

op_data = SELECT DYK_INSIGHT,COUNT(*)*SCORE AS FINAL_SCORE,COLUMN_ID as
COLUMN_SPEC from :op_data_tmp GROUP BY COLUMN_ID,DYK_INSIGHT,SCORE;

END;
```

FIG. 4D

```
select TOP 5 from
PRAJNAA.ARCH1_4FBC704577EF8112E10000000A358198_DYKRESULTVIEW ORDER BY
FINAL_SCORE DESC WITH PARAMETERS ('placeholder' = ('$$ss_id$$',
'2'),'placeholder' = ('$$req_id$$','dummy'),'placeholder' = ('$$op_data$$',
'Prajnaa.DYK_RESULT_TABLE'));
```

FIG. 5

```
CREATE PROCEDURE DYK_BoxNWhisker(IN inputs DYK_Input_DataSet2,IN dim_count
INTEGER,IN cnt_tab DYK_CNTRL_TABLE,OUT opTable DYK_FINAL_TABLE)
LANGUAGE SQLSCRIPT READS SQL DATA
AS
total Double := 0.0;
Max_Dist Double := 0.0;
IQR_Count Integer := 0;
Outlier_Cnt Integer := 0;
BEGIN
    sorted_IP = SELECT * FROM :inputs ORDER BY VALUE;
    CALL DYK_Compute_IQR1(:sorted_IP, results);
    SELECT COUNT(*) INTO IQR_Count from :results;
    if (:IQR_Count != 0) then
        op_outliers1 = SELECT DISTINCT VALUE as OUTLIER_VALUE, 'LOW' as
TYPE, ROUND(ABS(LOWRANGE - VALUE),2) AS DISTANCE FROM :sorted_IP, :results
WHERE VALUE < (SELECT LOWRANGE FROM :results)
                    UNION
                SELECT DISTINCT VALUE as OUTLIER_VALUE,
'HIGH' as TYPE, ROUND(ABS(VALUE - UPRANGE),2) AS DISTANCE
FROM :sorted_IP, :results WHERE VALUE > (SELECT UPRANGE FROM :results)
                    ORDER BY VALUE;

SELECT COUNT(*) INTO Outlier_Cnt from :op_outliers1;
        if(:Outlier_Cnt != 0) then
            SELECT MAX(DISTANCE) INTO Max_Dist FROM :op_outliers1;
```

FIG. 6A

```
                op_outliers = SELECT OUTLIER_VALUE, TYPE, DISTANCE,
CEIL(ROUND((DISTANCE/:Max_Dist)*5,2)) AS SCORE FROM :op_outliers1;
                op_outliers2 = SELECT VALUE, CAST("DIM1" as VARCHAR) as
DIM1,CAST("DIM2" as VARCHAR) as DIM2,CAST("DIM3" as VARCHAR) as
DIM3,SCORE,TYPE FROM :inputs , :op_outliers WHERE :op_outliers.OUTLIER_VALUE
= :inputs.VALUE;
                op_outliers3 = select * from :op_outliers2 order by VALUE
DESC;
                /*make a call to format output proc using control table and
op_outliers*/
                CALL DYK_FORMAT_BNWRESULT_TO_DYK2(:op_outliers3, :cnt_tab,
dim_count, opTable);
                end if;
        end if;
END;
```

FIG. 6B

```
CREATE PROCEDURE DYK_FORMAT_BNWRESULT_TO_DYK2(IN input_dataset
DYK_OUTLIERS_INPUT, IN cnt_Tab DYK_CNTRL_TABLE,IN dim_count INTEGER,OUT
out_tab DYK_FORMAT_TABLE  )
LANGUAGE LLANG READS SQL DATA AS
BEGIN
typedef Table<Double "VALUE",String "DIM1",String "DIM2",String "DIM3",Double
"SCORE", String "TYPE"> T_INPUT_TAB;
typedef Table<String "COLUMN_NAME",Fixed8<0> "COLUMN_OID",String
"DYK_INSIGHT",Double "SCORE",String "DIM_VAL",String "COLUMN_ID">
T_OUTPUT_TAB;
typedef Table<String "COLUMN_NAME",Fixed8<0> "COLUMN_OID"> T_CNT_TAB;

export Void main(T_INPUT_TAB input_dataset,
                 T_CNT_TAB cnt_tab,
                 Int32 dim_count,
                 T_OUTPUT_TAB & out_tab
                 )
{
Size d_count = Size(dim_count);
Size input_row = Size(0);
Size cntrl_row = Size(0);
Size out_row = Size(0);
Size total_input = input_dataset.getSize();
Size total_cntrl = cnt_tab.getSize();
Trace trace;
try{
    Column<Double> value_col = input_dataset.getColumn<Double>("VALUE");
    Column<String> dim1_col  = input_dataset.getColumn<String>("DIM1");
    Column<String> dim2_col  = input_dataset.getColumn<String>("DIM2");
    Column<String> dim3_col  = input_dataset.getColumn<String>("DIM3");
    Column<Double> score_col = input_dataset.getColumn<Double>("SCORE");
    Column<String> type_col  = input_dataset.getColumn<String>("TYPE");
```

FIG. 7A

```
Column<String> dim_col;
Column<String> clnm_col = cnt_tab.getColumn<String>("COLUMN_NAME");
Column<Fixed8<0>> cloid_col =
    cnt_tab.getColumn<Fixed8<0>>("COLUMN_OID");
Column<String> out_clnm_col =
    out_tab.getColumn<String>("COLUMN_NAME");
Column<Fixed8<0>> out_cloid_col =
    out_tab.getColumn<Fixed8<0>>("COLUMN_OID");
Column<String> out_dyk_insight_col =
    out_tab.getColumn<String>("DYK_INSIGHT");
Column<Double> out_score_col = out_tab.getColumn<Double>("SCORE");
Column<String> out_dyk_val_col = out_tab.getColumn<String>("DIM_VAL");
Column<String> out_col_id_col =
    out_tab.getColumn<String>("COLUMN_ID");
String dim_val;
String dim1;
String dim2;
String dim3;
String type_val;
String col_name;
Fixed8<0> col_oid;
String dim_str = String("DIM");
String measure_name;
String open_brace = String("{");
String close_brace = String("}");

Double score;

while(input_row < total_input){
    score = score_col[input_row];
    type_val = type_col[input_row];
    //get dimension values from input_dataset based on dim_count
    cntrl_row = Size(0);
```

FIG. 7B

```
        Int32   i = Int32(1);
        dim_val =    String("");
        string col_id = String("");
        String dyk_insight = String("");
        String dyk_dim_val = String("");
        measure_name = clnm_col[cntrl_row];
        col_id =
col_id.append(open_brace).append("\"").append(String(cloid_col[cntrl_row])).a
ppend("\"").append(String(":")).append("\"\"");
        cntrl_row = cntrl_row.next();
        while(i <= dim_count) {
            dim_str =   String("DIM");
            dim_col =
input_dataset.getColumn<String>(dim_str.append(String(i)) );
            col_name = clnm_col[cntrl_row];
            if(i > 1) {
                dim_val = dim_val.append(String(" and "));
            }
            dim_val = dim_val.append(col_name).append(String(" is
")).append(dim_col[input_row]);
col_id.append(String(",")).append("\"").append(String(cloid_col[cntrl_row]).
append("\"").append(String(":")).append("\"").append(dim_col[input_row]).appe
nd("\"");
            cntrl_row = cntrl_row.next();
            i = i+ Int32(1);
        }
        col_id = col_id.append(close_brace);
        dyk_insight = String("The ").append(measure_name).append(String("
is ")).append(type_val).append(String(" when ")).append(dim_val);
        i = Int32(1);
        cntrl_row = Size(0);
        while(cntrl_row <= d_count) {
```

FIG. 7C

```
dim_val = String("");
if(cntrl_row > Size(0)){
    dim_str =  String("DIM");
    dim_col =
input_dataset.getColumn<String>(dim_str.append(String(i)) );
    dim_val = dim_col[input_row];
    i = i+ Int32(1);
}else{ col_name = clnm_col[cntrl_row];
col_oid = cloid_col[cntrl_row];
out_clnm_col[out_row]    = col_name;
out_cloid_col[out_row]   = col_oid;
out_dyk_insight_col[out_row] = dyk_insight;
out_score_col[out_row]   = score;
out_dyk_val_col[out_row] = dim_val;
out_col_id_col[out_row]  = col_id;
out_row = out_row.next();
cntrl_row=cntrl_row.next();
} input_row = input_row.next();
}
}catch(Exception::ElementAccess ){
    trace.append("Error in algo");
}catch(Exception::ArgumentValue){
    trace.append("Error in algo");
}catch(Exception::TypeMismatch ){
    trace.append("Error in algo");
}
}
END;
```

FIG. 7D

```
CREATE PROCEDURE DYK_Percentage
(
    IN inputs DYK_Input_DataSet2,
    IN dim_count INTEGER,
    IN cnt_tab DYK_CNTRL_TABLE,
    OUT outputs DYK_FINAL_TABLE
)
LANGUAGE SQLSCRIPT READS SQL DATA AS
total Double := 0.0;
totalCount Integer := 0;
BEGIN
    select SUM(VALUE) INTO total from :inputs;
    if (:total != 0) then
        select count(*) INTO totalCount from :inputs;
        ordered_input_p = select VALUE, (VALUE*100/:total) as PERCENTAGE
FROM :inputs order by VALUE DESC;
        reverse_ordered_p = select VALUE, (VALUE*100/:total) as
PERCENTAGE FROM :inputs order by VALUE ASC;
            CALL DYK_COMPUTE_CUMULATIVE_PERCENTAGE(:ordered_input_p,
ordered_input_cp);
            CALL DYK_COMPUTE_CUMULATIVE_PERCENTAGE(:reverse_ordered_p,
reverse_ordered_input_cp);
        major = select * from :ordered_input_cp
                where :ordered_input_cp.CUMULATIVE_PERCENTAGE<60
                UNION ALL
                select TOP 1 VALUE, PERCENTAGE, CUMULATIVE_PERCENTAGE
from :ordered_input_cp where :ordered_input_cp.CUMULATIVE_PERCENTAGE>=60;
```

FIG. 8A

```
    minor = select * from :reverse_ordered_input_cp
where :reverse_ordered_input_cp.CUMULATIVE_PERCENTAGE<=10;
                /*outputs = select * from :minor;*/
    tmp1 = select DISTINCT :major.VALUE as VALUE, CAST("DIM1" as
VARCHAR) as DIM1,CAST("DIM2" as VARCHAR) as DIM2,CAST("DIM3" as VARCHAR) as
DIM3,CAST(1 AS DOUBLE) AS SCORE,ROUND(PERCENTAGE,2) as PRCNT
from :inputs , :major where :inputs.VALUE = :major.VALUE;
    CALL DYK_FORMAT_PRCNTLRSULT_TO_DYK(:tmp1, :cnt_tab, dim_count,
60,totalCount,outputs1);

tmp2 = select DISTINCT :minor.VALUE as VALUE, CAST("DIM1" as
VARCHAR) as DIM1,CAST("DIM2" as VARCHAR) as DIM2,CAST("DIM3" as VARCHAR) as
DIM3,CAST(1 AS DOUBLE) AS SCORE,ROUND(PERCENTAGE,2) as PRCNT
from :inputs , :minor where :inputs.VALUE = :minor.VALUE;
    CALL DYK_FORMAT_PRCNTLRSULT_TO_DYK(:tmp2, :cnt_tab, dim_count,
10,totalCount,outputs2);

outputs = select * from :outputs1 UNION ALL select *
from :outputs2;
    end if;

END;
```

FIG. 8B

```
CREATE PROCEDURE DYK_COMPUTE_CUMULATIVE_PERCENTAGE(IN input_dataset
DYK_PERCENTAGE_TABLE, OUT out_tab DYK_CUMULATIVE_PERCENTAGE_TABLE )
LANGUAGE LLANG READS SQL DATA AS
BEGIN typedef Table<Double "VALUE",Double "PERCENTAGE"> T_INPUT_TAB;
typedef Table<Double "VALUE",Double "PERCENTAGE", Double
"CUMULATIVE_PERCENTAGE"> T_OUTPUT_TAB;

export Void main(T_INPUT_TAB input_dataset,
                 T_OUTPUT_TAB & out_tab
                 )
{

Size input_row = Size(0);
Size out_row = Size(0);
Size total_input = input_dataset.getSize();

Column<Double> value_col = input_dataset.getColumn<Double>("VALUE");
Column<Double> percentage_col =
input_dataset.getColumn<Double>("PERCENTAGE");

Column<Double> out_val_col = out_tab.getColumn<Double>("VALUE");
Column<Double> out_per_col = out_tab.getColumn<Double>("PERCENTAGE");
Column<Double> out_cum_per_col =
out_tab.getColumn<Double>("CUMULATIVE_PERCENTAGE");

Double val = Double(0);
Double per_val;
Double cum_per_val;
```

FIG. 9A

```
Trace trace;
try {
    while(input_row < total_input){
        val = value_col[input_row];
        per_val = percentage_col[input_row];
        cum_per_val = cum_per_val + per_val;

out_val_col[out_row] = val;
        out_per_col[out_row] = per_val;
        out_cum_per_col[out_row] = cum_per_val;

input_row = input_row.next();
        out_row = out_row.next();
    }
}catch(Exception::ElementAccess ){
    trace.append("Error in percent algo");
}catch(Exception::ArgumentValue){
    trace.append("Error in percent algo");
}catch(Exception::TypeMismatch ){
    trace.append("Error in percent algo");
}
}
END;
```

FIG. 9B

```
SQL Result
select count(*) from "ARCH"."4FBC94EF77EF8112E10000000A358198"
```

| | COUNT(*) |
|---|---|
| 1 | 42901 |

| | Store_Sales | Store_cost | unit_sales | product_name | brand_name | Customer_lname | Customer_fname | Customer_city | Customer_country | yearly_income | member_card | Customer_occl |
|---|---|---|---|---|---|---|---|---|---|---|---|---|
| 1 | 6.48 | 2.14 | 3 | CDR Extra Chunky Peanut Butter | CDR | Rivera | Nichelle | Bremerton | USA | USD30K-USD50K | Bronze | Skilled Manual |
| 2 | 6.48 | 2.53 | 3 | CDR Extra Chunky Peanut Butter | CDR | Scott | Marie | Bremerton | USA | USD30K-USD50K | Bronze | Skilled Manual |
| 3 | 7.95 | 2.7 | 3 | CDR Creamy Peanut Butter | CDR | Anderson | Susan | San Gabriel | USA | USD30K-USD50K | Bronze | Manual |
| 4 | 8.85 | 3.19 | 3 | CDR Strawberry Jam | CDR | Whitten | Frederick | Bremerton | USA | USD30K-USD50K | Bronze | Skilled Manual |
| 5 | 7.62 | 2.9 | 3 | CDR Apple Jam | CDR | Flynn | Mary | Bremerton | USA | USD30K-USD50K | Bronze | Manual |
| 6 | 2.01 | 0.9 | 3 | CDR Low Fat Apple Butter | CDR | Thomas | Marie | Port Orchard | USA | USD30K-USD50K | Bronze | Manual |
| 7 | 2.01 | 0.9 | 3 | CDR Low Fat Apple Butter | CDR | Daly | Mustafa | Port Orchard | USA | USD30K-USD50K | Bronze | Manual |
| 8 | 2.01 | 0.96 | 3 | CDR Low Fat Apple Butter | CDR | Kochan | Julianna | Seattle | USA | USD30K-USD50K | Bronze | Skilled Manual |
| 9 | 2.01 | 0.9 | 3 | CDR Low Fat Apple Butter | CDR | Burke | Terri | Arcadia | USA | USD30K-USD50K | Bronze | Skilled Manual |
| 10 | 7.14 | 2.14 | 3 | CDR Pepper | CDR | Villenas | Lorraine | Newport Be... | USA | USD30K-USD50K | Bronze | Skilled Manual |
| 11 | 1.83 | 0.84 | 3 | CDR Strawberry Jelly | CDR | Derrington | Susanna | Bremerton | USA | USD30K-USD50K | Bronze | Manual |
| 12 | 10.56 | 3.27 | 3 | CDR Vegetable Oil | CDR | Afana | Bonnie | Newport Be... | USA | USD30K-USD50K | Bronze | Skilled Manual |
| 13 | 10.74 | 5.26 | 3 | CDR Regular Coffee | CDR | Bordwell | Gaines | Edmonds | USA | USD30K-USD50K | Bronze | Skilled Manual |
| 14 | 10.74 | 4.94 | 3 | CDR Regular Coffee | CDR | Pilotte | Cindy | Issaquah | USA | USD30K-USD50K | Bronze | Manual |

FIG. 10

```
select * from "PRAJNAA"."ARCH_4FBC94EF77EF8112E10000000A358198_DYKRESULTVIEW" ORDER BY
FINAL_SCORE DESC WITH PARAMETERS ('placeholder' = ('$$ss_id$$','2'),'placeholder' =
('$$reg_id$$','dummy'),'placeholder' = ('$$op_data$$','Prajnaa.DYK_RESULT_TABLE'))
```

| | DYK_INSIGHT | FINAL_SCORE | COLUMN_SPEC |
|---|---|---|---|
| 1 | The Store_Sales is HIGH when Customer_city is Port Orchard | 10.0 | {"248724":"","248731":"Port Orchard"} |
| 2 | Promotion_name : No Promotion contributes to 83.90 Percentage of the Store_Sales | 10.0 | {"248724":"","248737":["No Promotion"]} |
| 3 | The Store_cost is HIGH when Customer_city is Olympia | 10.0 | {"248725":"","248731":"Olympia"} |
| 4 | The Store_cost is HIGH when Customer_city is Bremerton | 10.0 | {"248725":"","248731":"Bremerton"} |
| 5 | The Store_Sales is HIGH when media_type is No Media | 10.0 | {"248724":"","248738":"No Media"} |
| 6 | The Store_Sales is HIGH when promotion_name is No Promotion | 10.0 | {"248724":"","248737":"No Promotion"} |
| 7 | The Store_cost is HIGH when Customer_city is Port Orchard | 10.0 | {"248725":"","248731":"Port Orchard"} |
| 8 | The Store_Sales is HIGH when Customer_city is Olympia | 10.0 | {"248724":"","248731":"Olympia"} |
| 9 | The Store_Sales is HIGH when Customer_city is Bremerton | 10.0 | {"248724":"","248731":"Bremerton"} |
| 10 | The Store_cost is HIGH when Customer_city is Tacoma | 8.0 | {"248725":"","248731":"Tacoma"} |
| 11 | The Store_Sales is HIGH when Customer_city is Tacoma | 8.0 | {"248724":"","248731":"Tacoma"} |
| 12 | The Store_Sales is HIGH when Customer_city is Puyallup | 8.0 | {"248724":"","248731":"Puyallup"} |
| 13 | The Store_cost is HIGH when Customer_city is Puyallup | 8.0 | {"248725":"","248731":"Puyallup"} |
| 14 | media_type : No Media contributes to 83.90 Percentage of the Store_Sales | 6.0 | {"248724":"","248738":["No Media"]} |
| 15 | Promotion_name : Unbeatable Price Savers, Two Day Sale,Price Destroyers, Three f... | 6.0 | {"248724":"","248737":["Unbeatable Pri... |
| 16 | The Store_Sales is HIGH when promotion_name is You Save Days | 2.0 | {"248724":"","248737":"You Save Days"} |
| 17 | The Store_Sales is HIGH when Customer_city is Milwaukie | 2.0 | {"248724":"","248731":"Milwaukie"} |
| 18 | The Store_Sales is HIGH when Customer_city is Milwaukie | 2.0 | {"248724":"","248731":"Milwaukie"} |
| 19 | media_type : Daily Paper,TV,Sunday Paper,Street Handout,In-Store Coupon,Radio... | 2.0 | {"248724":"","248738":["Daily Paper","T... |
| 20 | Customer_city : Bremerton,Port Orchard,Milwaukie,Beaverton,Oregon City,W, Lin... | 2.0 | {"248724":"","248731":["Bremerton","P... |
| 21 | Customer_city : Bremerton,Port Orchard,Milwaukie,Beaverton,Oregon City,W, Lin... | 2.0 | {"248725":"","248731":["Bremerton","P... |

```
Statement 'select * from "PRAJNAA"."ARCH_4FBC94EF77EF8112E10000000A358198_DYKRESULTVIEW"
ORDER BY FINAL_SCORE ...' successfully executed in 14.754 se
Fetched 21 row(s) in 0 ms 120 µs
```

FIG. 11

INSIGHT GENERATION FROM STATISTICAL MEASURE/DIMENSION COMBINATIONS

BACKGROUND

Embodiments of the present invention relate to analysis of data stored in databases, and in particular to generation of ranked insight for statistically valid combinations of measures and dimensions.

Unless otherwise indicated herein, the approaches described in this section are not prior art to the claims in this application and are not admitted to be prior art by inclusion in this section.

A business problem may call for identifying relevant data within a large volume of a data warehouse, to perform analysis and create a solution strategy. Automated analysis tools may afford a user with statistical insights regarding such large data volumes.

Conventional analysis tools may provide analytical insight, but typically require frequent manual intervention by the user. This slows the process, and requires the user to exercise statistical knowledge in order to use the tool and interpret the insights provided.

To achieve favorable performance on these large datasets, many tools employ supporting intermediate physical tables. This involves maintenance with respect to durability, confidentiality, and integrity of the data.

Sequential generation of insights for each combination of data per user dataset, increases the response time with increase in number of datasets and the users. This situation may become more difficult with large datasets having many measures and dimensions.

Moreover, the overall ranking of insights may become invalid unless terms in the request inputs are considered. These terms are available only at runtime, hence pre-generated insights provided by conventional analysis tools may not be relevant to the request.

Accordingly, the present disclosure addresses these and other issues with systems and methods generating ranked insight for statistically valid combinations of measures and dimensions.

SUMMARY

Insights gleaned from statistical analysis of a dataset of an in-memory database, may be obtained with high throughput. In response to a user query, a Data Inference Engine (DIE) provides statistically valid measure/dimension combinations of the dataset to an analysis tool. A master procedure may be executed at search query runtime, allowing timely filtering of output of the analysis tool based on columns provided in the user request. Inputs/outputs of the master procedure may avoid storing physical tables, reducing maintenance. The master procedure may comprise individual sub-procedures (e.g. determining outliers, percentage contribution) executed in parallel. Output of sub-procedure(s) may be formatted per a final output format, facilitating union therebetween. Embodiments may filter certain measure/dimension combinations received from the DIE. For example, embodiments may consider only unique measure/dimension combinations (irrespective of dimension order), a limited number of combinations (e.g. ≤20), and/or combinations having a limited number of dimensions (e.g. ≤3).

An embodiment of a computer-implemented method comprises causing an insight analysis tool to receive from a data inference engine, an input comprising a measure/dimension combination of a dataset stored in an in-memory database. The insight analysis tool is caused to process the input according to a master procedure comprising a sub-procedure, in order to generate an insight, and the insight is caused to be displayed to a user.

An embodiment of a non-transitory computer readable storage medium embodies a computer program for performing a method comprising causing an insight analysis tool to receive from a data inference engine, an input comprising a measure/dimension combination of a dataset stored in an in-memory database. The insight analysis tool is caused to process the input according to a master procedure comprising a sub-procedure in order to generate an insight, the insight is caused to be displayed to a user.

An embodiment of a computer system comprises one or more processors and a software program executable on said computer system. The software program is configured to cause an insight analysis tool to receive from a data inference engine, an input comprising a measure/dimension combination of a dataset stored in an in-memory database. The software program is further configured to cause the insight analysis tool to process the input according to a master procedure comprising a sub-procedure, in order to generate an insight, and to cause the insight to be displayed to a user.

In some embodiments the input comprises a result of a user query to the in-memory database, and the insight analysis tool is caused to process the input during a runtime of the user query.

According to particular embodiments the insight analysis tool is caused to process the input according to a parameter of the user query.

In certain embodiments the insight analysis tool is further configured to generate a plurality of insights from the input, and to rank the insight relative to the plurality of insights.

In various embodiments the insight analysis tool is further configured to receive a plurality of measure/dimension combinations, and to filter the plurality of measure/dimension combinations to generate the insight.

According to particular embodiments the plurality of measure/dimension combinations comprise multiple dimensions, and filtering the plurality of measure/dimension combinations comprises limiting a number of insights, limiting a number of dimensions, and/or identifying unique measure/dimension combinations by disregarding an order in which dimensions occur.

In some embodiments the sub-procedure comprises outlier detection.

The following detailed description and accompanying drawings provide a better understanding of the nature and advantages of particular embodiments.

BRIEF DESCRIPTION OF THE DRAWINGS

FIGS. 3A-D show a code snippet showing dynamic creation of a master procedure at runtime.

FIGS. 4A-D show code defining a master procedure according to an embodiment.

FIG. 5 shows code for a Query for obtaining a top five DYK insights from the ResultView.

FIGS. 6A-B show a code snippet for the BoxandWhisker sub-procedure according to an embodiment.

FIGS. 7A-D show a code snippet for formatting the BoxandWhisker output using LScript according to an embodiment.

FIGS. 8A-B show a code snippet for the actual SQL Percentage sub-procedure according to an embodiment.

FIGS. 9A-B show a code snippet for formatting the Percentage output using LScript according to an embodiment.

FIG. 11 is a Result View showing DYK statistical analytical insights generated for the sample dataset of FIG. 10.

DETAILED DESCRIPTION

Figure 1:
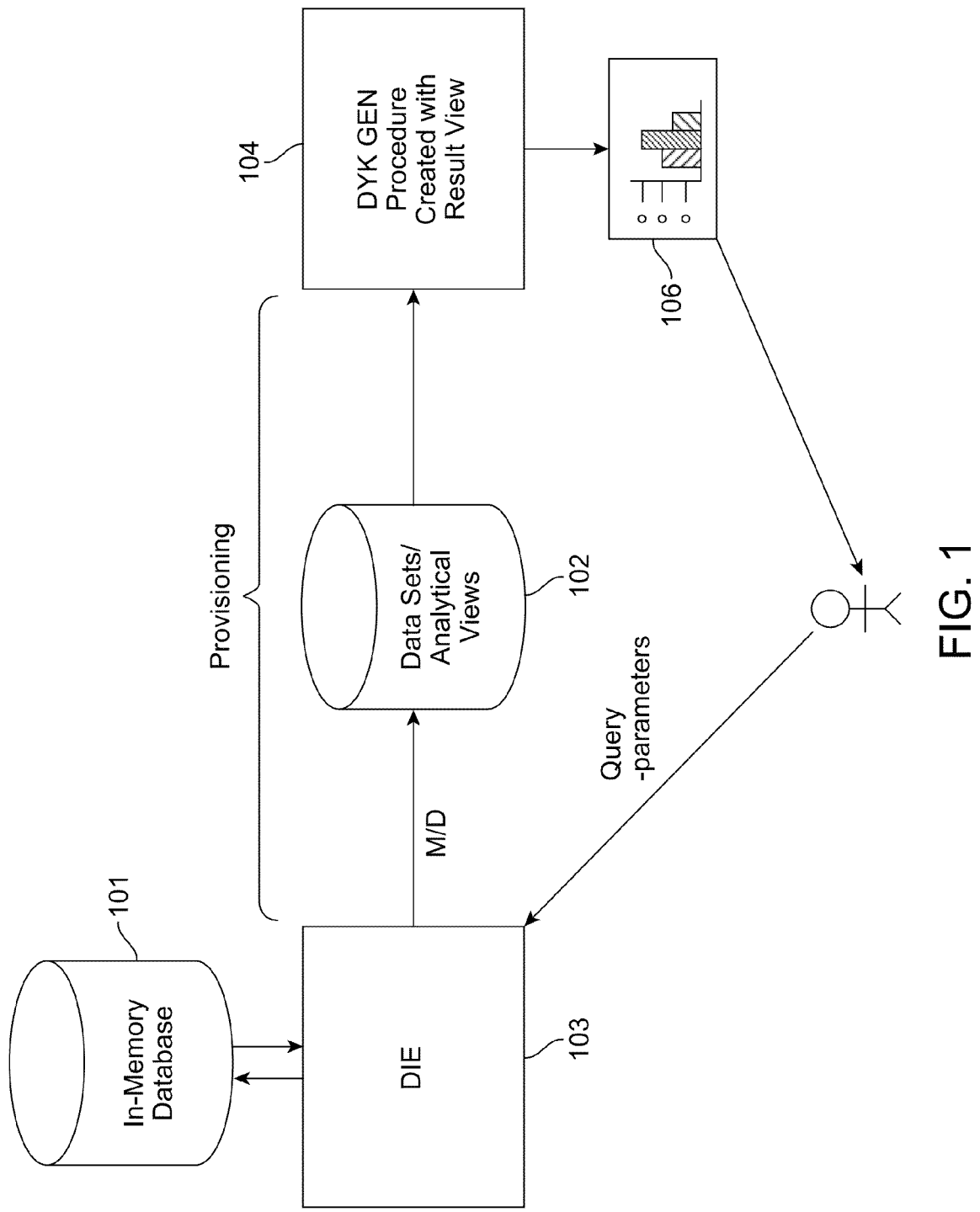
FIG. 1 is a simplified view showing the provisioning of datasets from an in-memory database.

Described herein are techniques for generating ranked insights for statistically valid combinations of measures and dimensions in a dataset. The apparatuses, methods, and techniques described below may be implemented as a computer program (software) executing on one or more computers. The computer program may further be stored on a non-transitory computer readable medium. The non-transitory computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Embodiments of the present invention may employ one or more of the following concepts, alone or in various combinations, to enhance the throughput of insight generation resulting from data analysis.

Embodiments may use stored procedures which call sub-procedures, to obtain insights for a dataset uploaded by a user. This can help in achieving the parallelization of sub procedure calls.

Embodiments may execute a stored procedure at run time during a search query. This can prevent generation of insights based upon any outdated information.

Embodiments may utilize a result view, holding the union of output from sub-procedures. This can provide the benefit of calling the procedure with select query, whose execution is faster in JavaScript as compared to a procedure call.

Embodiments may use table types for input and output tables of the stored procedures. This can help ensure that maintenance is not required, as there are no physical tables. Possible issues with data durability, confidentiality, and integrity are addressed as the insights are generated at real time and data is stored in memory.

Embodiments may implement outlier detection and percentage calculation algorithm(s) identifying out-of-the-box information from amongst the supplied data. Such outlier detection and percentage computation algorithms represent only specific examples, and other algorithms can be implemented. The purpose of such algorithms is to process the supplied data and identify out-of-the-box information (e.g. an insight) which helps the user to understand and improve his business.

In certain embodiments, a Data Inference Engine (DIE) may provide statistically valid combinations of a given dataset using data mining algorithms. Such use of combinations from a DIE avoids insight generation for any unnecessary combinations. This can reduce the response time.

Various embodiments may format the output from the sub-procedure as per the final output format. This can facilitate the union between the sub-procedure output and the final output.

Certain embodiments may filter the output of the insight analysis tool, based on the columns provided in the input request (the columns of interest to the user). Hence only those combinations in which the given columns are involved may be retained.

Embodiments may employ an internal ranking process in each sub procedure. This ranking process may add up to a final score across the sub procedures.

In some embodiments, a final score calculation technique may be based on partial match and full match, in order to provide the top insights from a returned dataset.

The following discussion provides a description of particular embodiments in connection with a "Did You Know?" analysis tool (hereafter "DYK") used in conjunction with a HANA in-memory database, both of which are available from SAP AG of Walldorf Germany. However, embodiments are not limited to working with this or any other particular analysis tool and/or database.

FIG. 1 is a simplified view showing the provisioning of datasets 102 from an in-memory database 101. The DYK insight analysis tool 104 generates statistical insight(s) 106 from the stored data, based upon measures (M) and dimensions (D) obtained by provisioning. Provisioning is a procedure which prepares a dataset for searching. A part of the provisioning process is creation of a DYK Master procedure (DYK GEN), which uses the combinations obtained from the DIE.

In particular, the combinations of measures and dimensions (M/D) are provided by Data Inference Engine (DIE) 103. The DIE provides statically valid combinations of measures and dimensions in a dataset. In certain embodiments the DIE helps in identifying the important combinations for DYK generation, thus avoiding the usage of unnecessary combinations.

Once the master procedure has been created during the provisioning process, it is then executed during a search workflow to internally call multiple sub-procedures to finally generate the analytical insight(s) 106. In certain embodiments, these sub-procedures may be LScript or SQL Script.

The inputs from the search request are considered for filtering and ranking. This is analogous to indexing the data first. Based on a search query the ranking is applied on indexed data.

While no separate indexing is performed as such, the master procedure is created during provisioning which gets triggered during search query. Then ranking is applied on the executed result.

Figure 2:
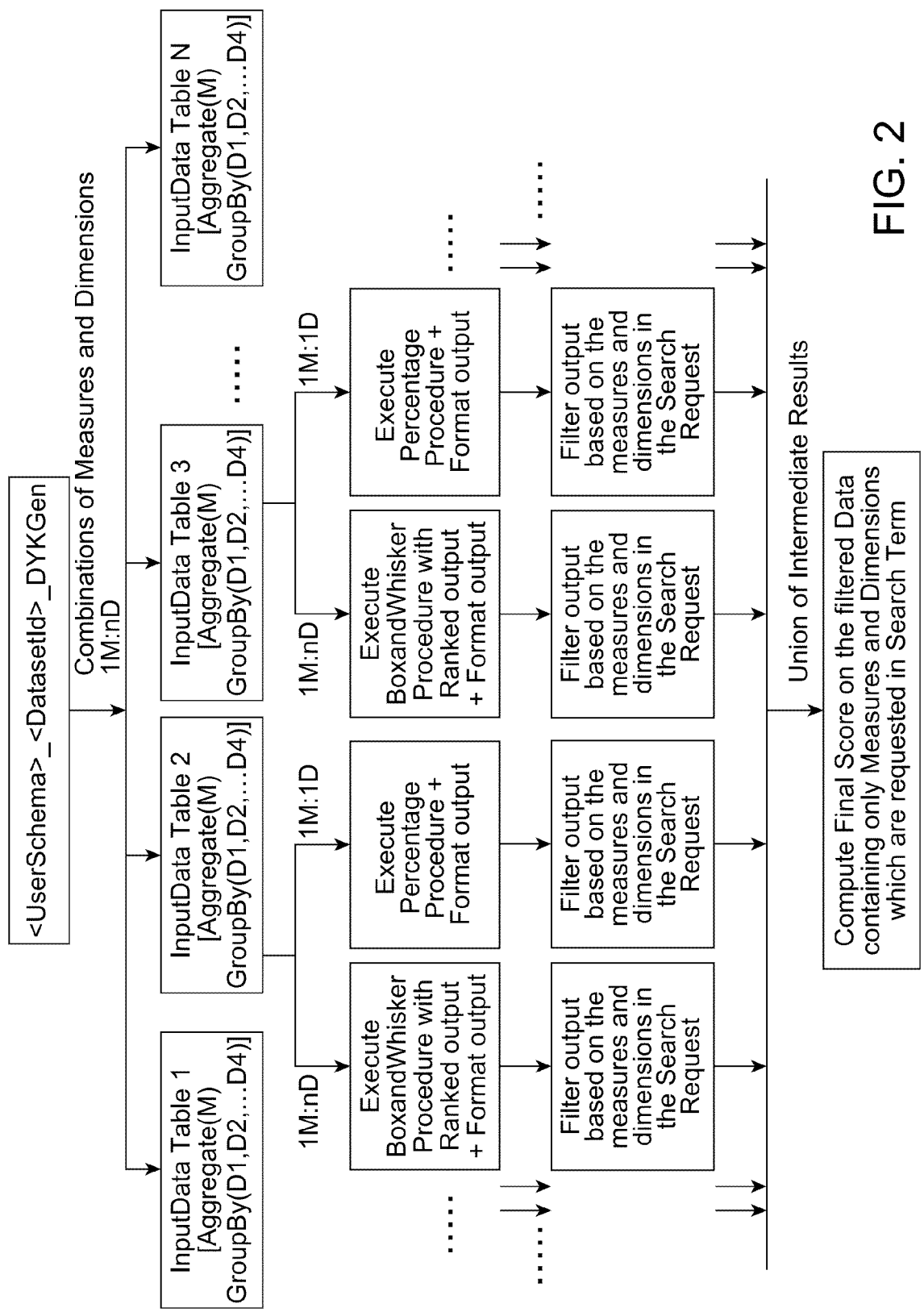
FIG. 2 shows a block diagram of a master procedure according to an embodiment.

The DYK insight analysis tool may be implemented as software, hardware, or a combination of both software and hardware. DYK insight generation logic may be put in a master stored procedure (DYK GEN), written in SQL Script. FIG. 2 shows a simplified view of an example of this master procedure.

The particular master procedure of the embodiment of FIG. 2 shows two sub-procedures: "BoxandWhisker" and "Percentage". As discussed in detail below, the BoxandWhisker sub-procedure is useful in identifying outlier data. The Percentage sub-procedure is useful in identifying percentages of dimensions contributing to percentages of measures.

The DYK master procedure is created per a dataset of a user. Whenever a dataset or an analytical view is provisioned, the DYK GEN Procedure is formed programmatically by running a JavaScript function in XSEngine. The User Schema and Dataset Id are appended to the name of the DYK GEN Procedure in order to keep the Procedure unique.

Inputs to the master procedure are sessionId and RequestId. Output of the master procedure is a ResultTable as a table type.

The master procedure gets compiled and created during the provisioning of the user data. The code snippet shown in FIGS. 3A-D gives the brief idea of dynamically creating the procedures at runtime.

Output from the master procedure may include output from each sub-procedure executed for each combination. With this, parsing of the DYK result from the result set in the Javascript, may become difficult with increased number of results in the result set.

According to an embodiment, the master procedure may be created with a Result View. Making use of the Result View in this manner, allows the output to be the union of output from each sub-procedure.

The master procedure is executed by firing a Select Query on the Result View, as would be the case for any other query on the table. With this, various operations like Group By, Order By, TOP, etc., are achievable. This makes the Result fetch faster.

As just mentioned, the output from each sub-procedure executed for each combination, is large in size. Where the master procedure performs a union of outputs of all the sub-procedures, the union of these large outputs can reduce a speed of execution of the master procedure.

According to particular embodiments, however, the SessionID and the RequestID of the DYK search request are passed as parameters to the master procedure. Specifically, before making the call to the master procedure, the DYK Search application would have populated the Search Control table for the user, with the SessionID, RequestID, and the ColumnIDs of the input columns.

The master procedure then uses the passed SessionID and RequestID, to filter out the data from the outputs of sub-procedures. Only that data containing the input Column IDs, are retrieved from the outputs of the sub-procedures.

The union of these filtered outputs takes less time than the union of the actual outputs of the sub-procedures. This can result in an overall performance improvement of the master procedure.

FIGS. 4A-D show code defining a master procedure according to an embodiment. FIG. 5 shows code for a Query for obtaining a top five DYK insights from the ResultView.

The master procedure receives the combination of measures and dimensions from the DIE. As shown in FIG. 2, in DYK the combination containing only one measure (1M) is considered for DYK insight generation. The intermediate tables used for computation at various levels of DYK generation are Table types, and hence the data is available in-memory.

For every combination, the input data is obtained from the user's dataset. This input Table definition is common to any type of combination. Each combination will contain one measure and one to three dimensions. Hence, a maximum number of columns in the input table is four.

The input data is generalized to suit the input table requirement. This idea avoids usage of multiple tables for different type of combination and data.

The input tables are then passed to the sub-procedures (BoxandWhisker and Percentage). These sub-procedures are used to calculate outliers and percentage of the Measures from the dataset. The sub-procedures are executed for each combination, and hence the output of these are unioned to get the final DYK output.

The BoxandWhisker sub-procedure is the implementation of outlier detection algorithm 'BoxandWhisker'. An outlier is one that appears to deviate markedly from other members of the sample in which it occurs.

For the given list of measure Value in the input data, outliers may be detected using pseudo-code as outlined below.

1. Sort the list of measure values in an array "data_array".
2. Take the size of the array: "total_size".
3. Calculate q1,q2,q3, and also start, mid, and end position.
4. Set the start_pos = 0.
5. Set the end_pos = total_size−1.
6. Set the mid_pos = total_size/2.
7. Take the middle value from the data_array as: mid_value = data_array[total_size/2].
8. Make q3_start_pos = mid_pos +1.
9. If total_size is odd, then:
    q1_end_pos = mid_pos −1; q2 = mid_value (50th percentile).
10. If total_size is even, then:
    a. Mid_previous_value = data_array[mid_pos − 1];
    b. q2 = (mid_value + mid_previous_value)/2.(50th percentile);
    c. q1_end_pos = mid_pos −1;
    d. q3_start_pos = mid_pos.
11. Calculate q1 25th percentile:
    a. Q1_mid = q1_en_pos−start_pos/2;
    b. If q1_mid is odd, q1 = data_array[q1_mid];
    c. Else , q1 = (data_array[q1_mid+1]+ data_array[q1_mid])/2;
12. Calculate q3 75th percentile:
    a. Q3_mid_pos = end_pos − q3_start_pos/2;
    b. Q3_mid = q3_start_pos + q3_mid;
    c. If q3_mid is odd, q3 = data_array[q3_mid];
    d. Else, q3 = (data_array[q3_mid −1] + data_array[q3_mid])/2.
13. Calculate IQR, iqr = q3−q1.
14. Set Ratio = 1.5.
15. Calculate quotient, quote = iqr * ratio.
16. Calculate LOWRANGE = q1−quote.
17. Calculate UPRANGE = q3+quote.
18. Filter the all values from data_array lesser than LOWRANGE and greater than UPRANGE. These are outliers.

For calculating the rank within the BoxandWhisker sub-procedure, the distance of each outlier value from the LOWRANGE and UPRANGE respectively, is computed. An example of pseudocode for rank calculation for BoxandWhisker is as follows:

1. Take the maximum distance from the outliers as max.
2. Consider the rank for maximum distance as 5 (Top rank).
3. Calculate the rank for each distance as (distance/max)*5. This will provide the ranks ranging from five (5) to one (1), with five being the top rank.

These outliers along with the rank are then formatted to match the final DYK result table definition. This formatting can be done using an L Script Procedure: DYK_COMPUTE_FORMAT_BNW_RESULT.

The input to this table is control_table, which is again a Table type. The control_table holds the column names and IDs of the measure and dimensions in each combination. This helps in changing the column headers from the input table into a row value in the final DYK output.

These column names are now associated with outlier values and add up to the final result. Every row of outlier output is merged with the every row of control_table.

Also, an additional column Column_Spec is populated, which holds the matched value of each outlier value. This column mainly comprises the name of the dimension(s) responsible for making this measure an outlier. This can be helpful when the user selects to view a next infoblock for that search request.

The dyk_insight column holds the actual insight. The final insight is framed by using the data in other columns in the output. The insight actually mentions whether the outlier is high or low, and states the names of the measures and values of the dimension. (Since the insight typically arises from more than one dimension, it may otherwise be difficult to identify the relevant dimension from the dataset, without accessing the actual outlier detection algorithm calling for specialized statistical knowledge).

FIGS. 6A-B show a code snippet for the BoxandWhisker sub-procedure according to an embodiment. FIGS. 7A-D show a code snippet for formatting the BoxandWhisker output using LScript according to an embodiment.

The following is an example of an outlier in the context of searching a database containing sales information for different lines of clothing:
"Store_Sales" is HIGH, when "Lines" is CLOTHS, "Category" is T-SHIRT, and "City" is NEWYORK, where:
  "Store_Sales" is the Measure;
  "Lines", "Category", "City" are dimensions; and
CLOTHS, T-SHIRT, and NEWYORK are the values of these respective dimensions.

The Percentage sub-procedure is also shown in FIG. 2. That algorithm allows determination if X % (or below) of dimensions are contributing to Y % (or more) of measure(s).

The algorithm of the Percentage sub-procedure may afford sensible insights using this algorithm. For example, an insight indicating that 15% of a CITIES dimension is contributing to 75% of a REVENUE measure, may be valuable in identifying profitable sales venues.

The following pseudo code may be useful to understand design of an algorithm for the Percentage sub-procedure.
1. Sort the input in the ascending order of the measure.
2. Compute the percentage value of measure for each dimension.
3. Compute the Cumulative Percentage (CP) for every row. CP is the sum of the percentages till that row.
4. Now, query for the rows whose CP is less than the set limit. As an example, for a CP of 60%, the query returns dimensions contributing up to 60% of measure.
5. Now compute the percentage of dimensions contributing to the 60% of Measure. This percentage has to be below the set limit (for example 20%).
6. If the percentage of dimensions is above 20%, then the data is discarded as it will not offer a particularly valuable statistical analytical insight.
7. If the percentage of dimensions is below 20%, then the statistical insight is considered valuable.
8. A scoring logic can be used here to score the insight. To score an insight, divide the set limit (20% in this case) into 5 units. Lower the percentage of dimensions contributing to 60% of measure, higher its score should be. So, if the percentage of dimensions falls under the range 1 to 4, then the score of the insight is 5; if the percentage falls under the range 4 to 8, then the score is 4. Similarly, if the range is 8 to 12 then score is 3. If the range is 12 to 16 then score is 2. If the range is 16 to 20 then the score is 1.
9. Finally, the insight is formatted into a proper text to be displayed in the UI.
This algorithm is used with the 1M*1D, as a limit is defined on the dimension.

An embodiment of the actual SQL Procedure is shown in FIGS. 8A-B. FIGS. 9A-B show the code snippet for formatting the output of the Percentage sub-procedure according to an embodiment.

EXAMPLE

Figure 10:
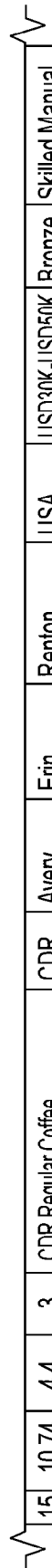
FIG. 10 is a view showing a sample dataset.

FIG. 10 is a view showing a sample dataset (Sales_Store/420000 rows) including the store and customer details, where:
DATASET ID: 4FBC94EF77EF8112E10000000A358198.
FIG. 11 is a Result View showing DYK statistical analytical insights generated in fourteen seconds, for this sample dataset.

Embodiments may address one or more issues arising from the operation of analysis tools. One such problem is handling large combinations.

Conventional execution of all the sub-procedures in DYK may consume time, if the number of combinations returned from the DIE is large. This undesirably increases the response time in the client.

Embodiments may avoid this delay by performing filtering. Specifically, the DIE is configured to provide statistically valid combinations of a given dataset, using data mining algorithms.

To reduce effort, embodiments filter the DIE combinations to consider only unique combinations. For Example, with a combination of a measure "M1" and dimensions "D1", "D2", and "D3", the possible combinations from DIE could be "M1D1D2D3", "M1D1D3D2", "M1D2D3D1", and "M1D3D2D1".

For the purposes of DYK, however, all four combinations produce the same output. Hence it is sufficient to take one unique combination for same set of measures and dimensions.

Thus according to an embodiment, only one out of the four combinations is picked for DYK as a unique combination. This may be done in a manner similar to doing "Group By" in SQL statement, where order in the Group By clause doesn't matter.

In this particular example, a number of combinations is reduced from four to one. When this refinement is performed over an entire dataset, the number of combinations is significantly reduced.

Moreover, various trials have indicated that more than 80% of the time the refined number of combinations does not exceed twenty (20). Hence, a number of combinations may be fixed to that number.

Taken alone or in combination, these filtering approaches serve to improve the performance of DYK generation process.

Another issue that may be arise in the conventional use of the DYK tool for data analysis, is the expenditure of significant effort for maintenance and housekeeping for DYK physical tables. Specifically, generating DYK offline as a separate thread without being included along with an actual business case, calls for storing the insights in physical tables in advance. Such an approach would also call for supporting tables to associate the insights with the dataset of a user.

Generating insights in this manner can lead to one or more of:
  a significant maintenance effort with regular housekeeping activities to store the insights;
  a need to lock the tables whenever multiple users try to update the same table;
  a need to handle race conditions a user is generating insights from a different session; and an inability to generate the data at real time, causing the data to be outdated.

Embodiments may address one or more of these issues by executing the master procedure at runtime. Since tables used for generating insights are Table types, there is no need for physical tables. The computations can be performed in memory.

Moreover, sub-procedures such as BoxandWhisker, Percentage, and associated formatting procedures, may be written in a generic way. Hence, there are only copy of these procedures for the entire schema. Thus while the master DYK generation procedure is created per User and per dataset, the algorithm procedures (e.g. BoxandWhisker and Percentage) are generic. The master DYK generation procedure(s) use the same copy of the algorithm procedures. So, a single copy of algorithm objects is maintained in the DB schema.

In addition, the master procedure may be designed to ensure that sub procedure calls are parallelized, and it is free of physical tables. This can reduce or eliminate maintenance effort.

Runtime execution of the mater procedure also allows the analysis tool to operate on large datasets with high performance, and to provide data at near real time.

Another issue that may be associated with conventional operation of the DYK analysis tool, is handling of input data from different sizes of measure-dimension combinations. Specifically, the dimension values are used to construct the insights.

Specifically, the dimension values are used to construct the insights. However, the master procedure itself is created at runtime, and measure-dimension combinations are also obtained at runtime.

The number of dimensions in each combination varies from 1 to n, and it is indefinite. That is, the number of dimensions in each combination is not the same. The number of dimensions may range as 1, 2, or 3. But while storing the input data for executing the algorithms based on these combinations, the number of columns should be same. Hence a generic format of the query may be used to fetch the data for any size of the combination. Since these dimension values are to be stored in the input table which will be processed further for outlier and percentage calculation, the input table definition differs for each size of combination and with each different dimension names.

Handling this situation in a conventional manner would require input tables matching each combination and dimension name. This would call for many condition checks in the master procedure to identify the right one, possibly degrading performance of the analysis tool.

It is generally acknowledged that human users have trouble visualizing or interpreting data for more than three dimensions. This may be attributable to the difficulty in depicting analysis results for more than three dimensions, on a two-dimensional medium such as a computer screen or a sheet of paper.

In recognition of this limited ability of users to process analytical results with excessive dimensions, particular embodiments may limit a combination length to a maximum of four. In such embodiments, every combination may have a single measure, and the dimension count varies from one to three.

Accordingly, issues associated with the use of multiple table definitions, may be resolved through use of a generic table definition with four generic columns Below is one table definition for the input data table:

```
create type DYK_Input_DataSet as TABLE("VALUE"
DOUBLE,"DIM1"
VARCHAR(1000),"DIM2" VARCHAR(1000),"DIM3"
VARCHAR(1000));
```

Here, the VALUE column corresponds to the measure. DIM1,DIM2,DIM3 correspond to the dimension.

Thus for any number of dimensions in the combination, the input data table holds three columns for dimension. For combinations having a dimension count of less than three, the DIM2 and DIM3 columns may contain repeated values of DIM1.

In order to map these DIM1,DIM2,DIM3 to their actual column names, for every iteration of the combination another generic table called control_table is populated with actual column names at runtime. Below is the definition of the control_table.

```
create type DYK_CNTRL_TABLE as
TABLE("COLUMN_NAME"
VARCHAR(100),"COLUMN_OID" BIGINT);
```

The approach just described not only simplifies the design, simple but also improves the performance of the insight generation.

Figure 12:
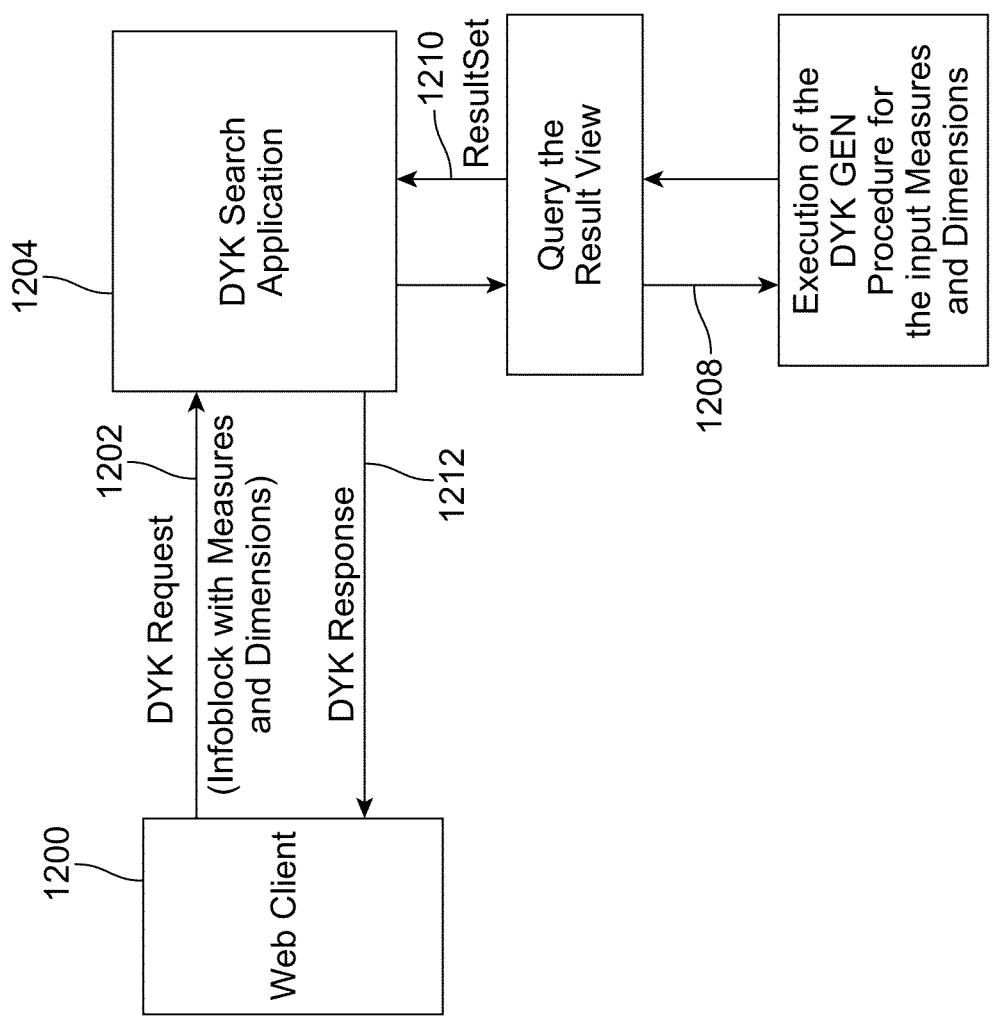
FIG. 12 shows execution of the DYK generation procedure.
Figure 12A:
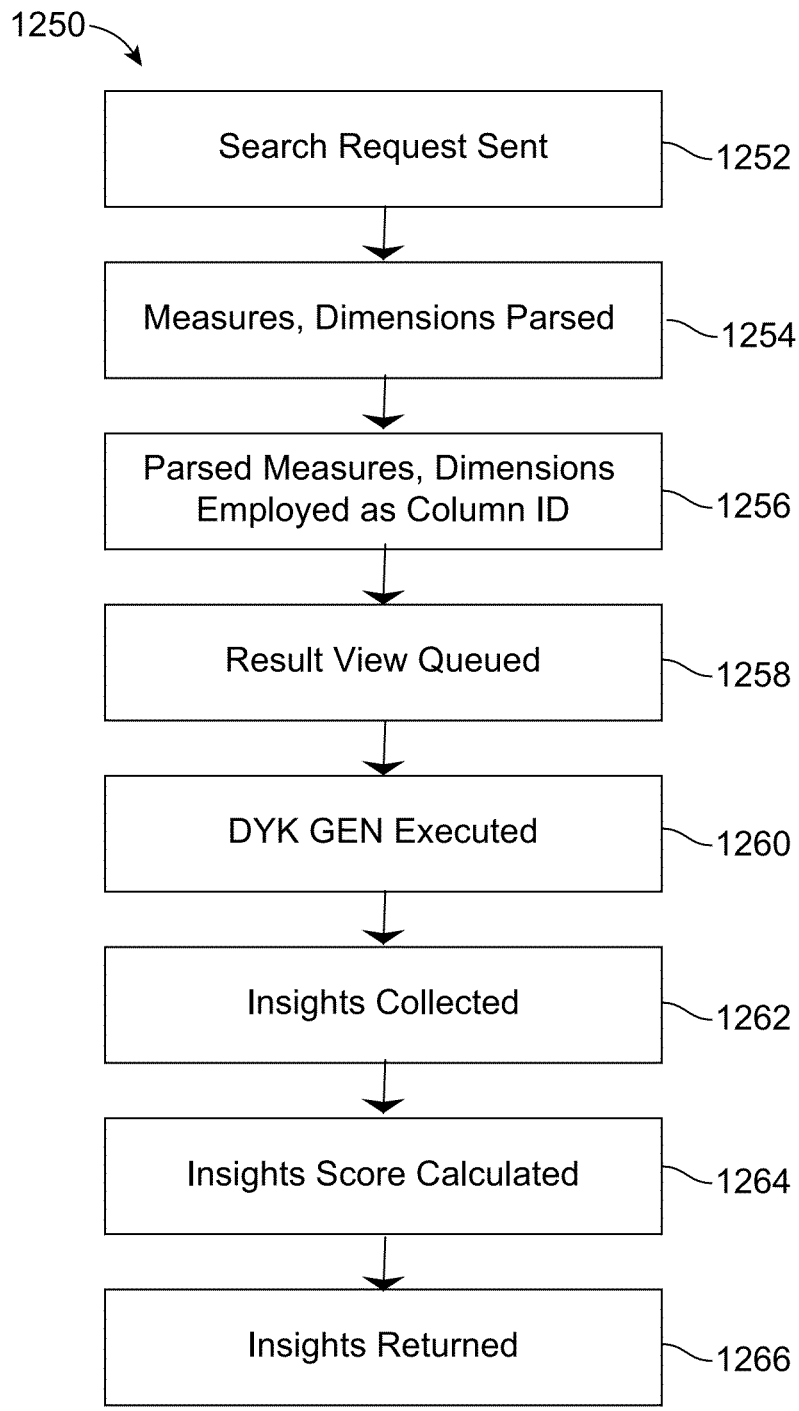
FIG. 12A provides a chart of a corresponding process flow.

Execution of the DYK generation procedure is described in connection with FIG. 12. FIG. 12A provides a chart of the corresponding process flow 1250.

Specifically, when a user 1200 (e.g. a Web Client) clicks on an Infoblock (i.e. a search result), a DYK search request 1202 is sent 1252 from the client. This search request includes the Infoblock XML.

The request is handled by the DYK Search application 1204. The following are steps performed by the DYK search application in order to return the response to the client.

The DYK search application parses 1254 the measures and dimensions from the XML. These parsed measures and dimensions are employed 1256 as column IDs in a search control table specific to a user. The Session ID and the Request ID are put against these Column IDs.

The ResultView is then queried 1258, and the Session ID and the Request ID are passed as parameters 1208. The query of the Result View triggers the execution 1260 of the DYK GEN master procedure.

After executing the sub-procedure algorithms (i.e. BoxandWhisker, Percentage) for the combinations, the master procedure picks up only those insights having the columns present in the search control table for that particular user, against the passed 'Session ID' and 'Request ID'.

The procedure collects 1262 all the DYK insights into one table type. The final score of insights is calculated 1264 by multiplying the algorithm score of the insights with the number of columns it has in common with the request.

Finally, 'N' number of insights are returned 1266 by the Result View query starting from 'X'. N is the number of insights requested from the Client, and X is the start index mentioned in the request.

As described above, insights may be filtered for the input columns from the request. Ordinarily, however, all possible insights may not be sent to the user as a response. Rather, embodiments may rank insights according to their importance, returning to the user only the top N insights (where N is the number requested by the Client).

Accordingly, embodiments may score individual insights based upon 'Partial Match' and 'Full Match' techniques with respect to the input columns Specifically, each insight is generated for a set of 1+n columns (1 measure, n dimensions).

If this set of columns completely matches the set of columns sent as input, then it is a 'Full Match'. If this set or part of this set, matches only a part of the set of input columns, then it is a 'Partial Match'.

In both the Full Match and Partial Match cases, the individual score of the insight (which is generated by the algorithm), is multiplied with the number of matching columns to generate a final score. So, if Y is the individual score of the insight, and Z is the total number of matching columns between the input columns and the columns for which the insight is generated, then the final score may be computed using Y*Z.

Once the final score is generated for all the insights, the insights are sorted on the descending order of the final score. From this set, as many insights are returned 1266 to the user as a ResultSet 1210 as are requested by the client.

Figure 13:
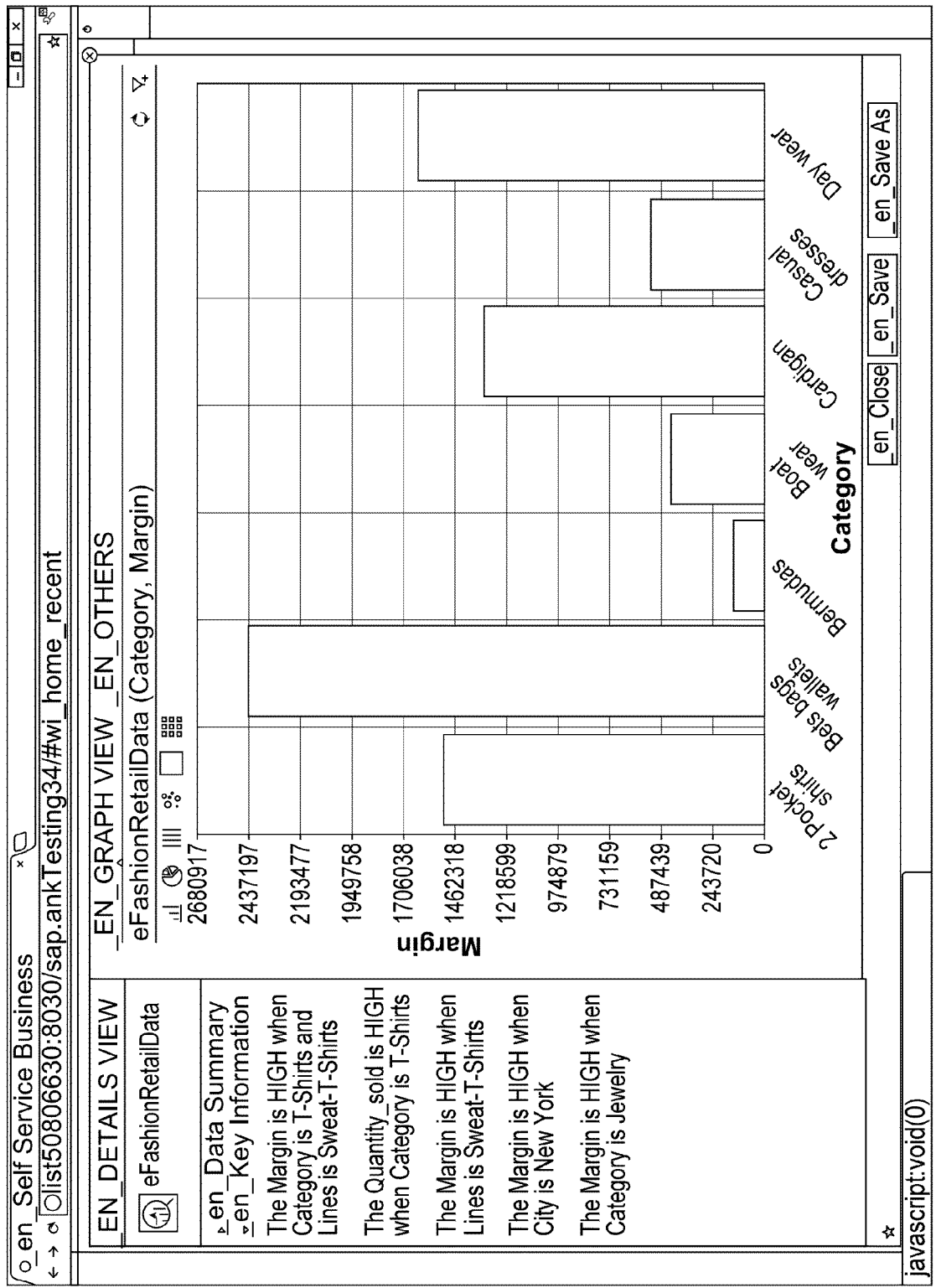
FIG. 13 shows Key Information presented to the left of results in bar chart format.
Figure 14:
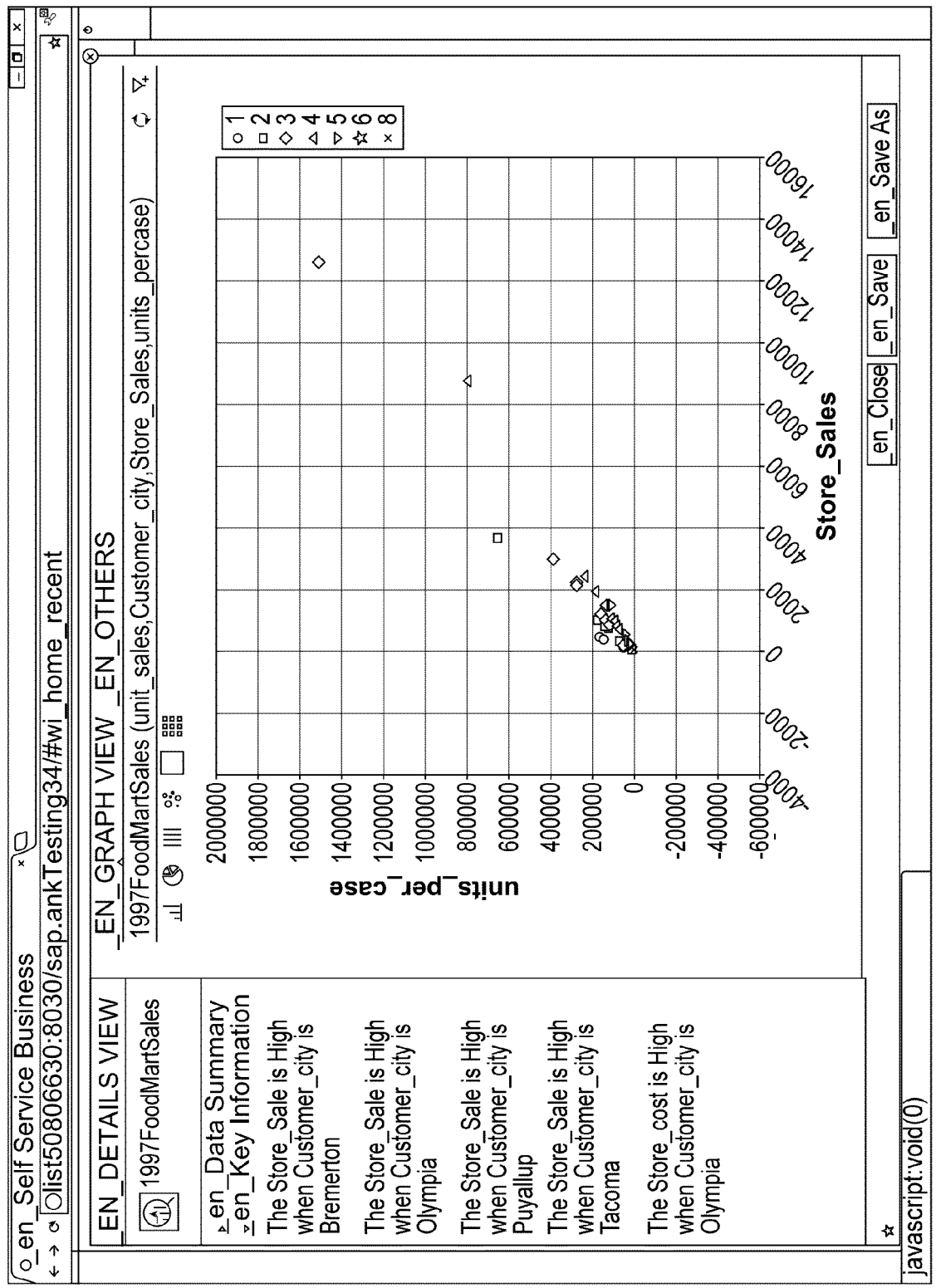
FIG. 14 shows Key Information presented to the left of results in the format of a plotted graph.

The insights may be displayed to the user in the DYK Response 1212 as "Key Information" in the client interface along with the statistical analysis insights. FIG. 13 shows such Key Information presented to the left of results in bar chart format. FIG. 14 shows Key Information presented to the left of results in the format of a plotted graph.

Figure 15:
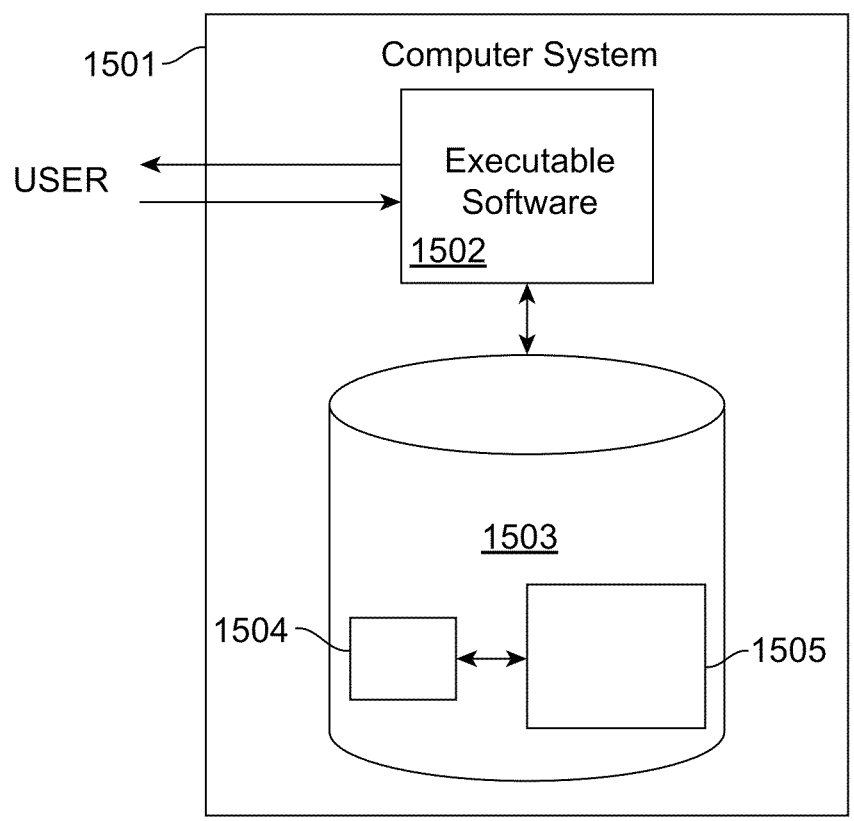
FIG. 15 illustrates hardware of a special purpose computing machine configured to perform insight generation according to an embodiment.

FIG. 15 illustrates hardware of a special purpose computing machine configured to perform insight generation according to an embodiment. In particular, computer system 1500 comprises a processor 1502 that is in electronic communication with a non-transitory computer-readable storage medium 1503. This computer-readable storage medium has stored thereon code 1505 corresponding to an insight analysis tool (e.g. DYK). Code 1504 corresponds to a DIE. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In conclusion, embodiments may seek to generate statistical analytical insights from a dataset in a manner that relies upon the speed and power afforded by an in-memory database. The DYK generation procedure has been designed so that the execution is parallelized.

Generation of the statistical analytical insights at runtime, on request, reduces the maintenance, as the generated insights are not required to be stored.

The use of Full/Partial Match and filtering, help retrieve the insights for only the input columns, in an efficient manner.

Utilization of the ResultView, makes it easier to operate on the output of the master procedure, and to retrieve the desired insights in the required order.

By using the DIE, embodiments ensure that combinations considered for generation of analytical insights, are valid and meaningful.

Embodiments may exhibit both adaptability and flexibility. In particular, embodiments may be plugged to an application that is using the same technology platform. Embodiments may be flexible in that different algorithms to generate insights can be added or removed as sub-procedures.

Finally, use of the ranking technique helps to ensure that the insights are prioritized, and that the high priority insights are returned to the user.

Figure 16:
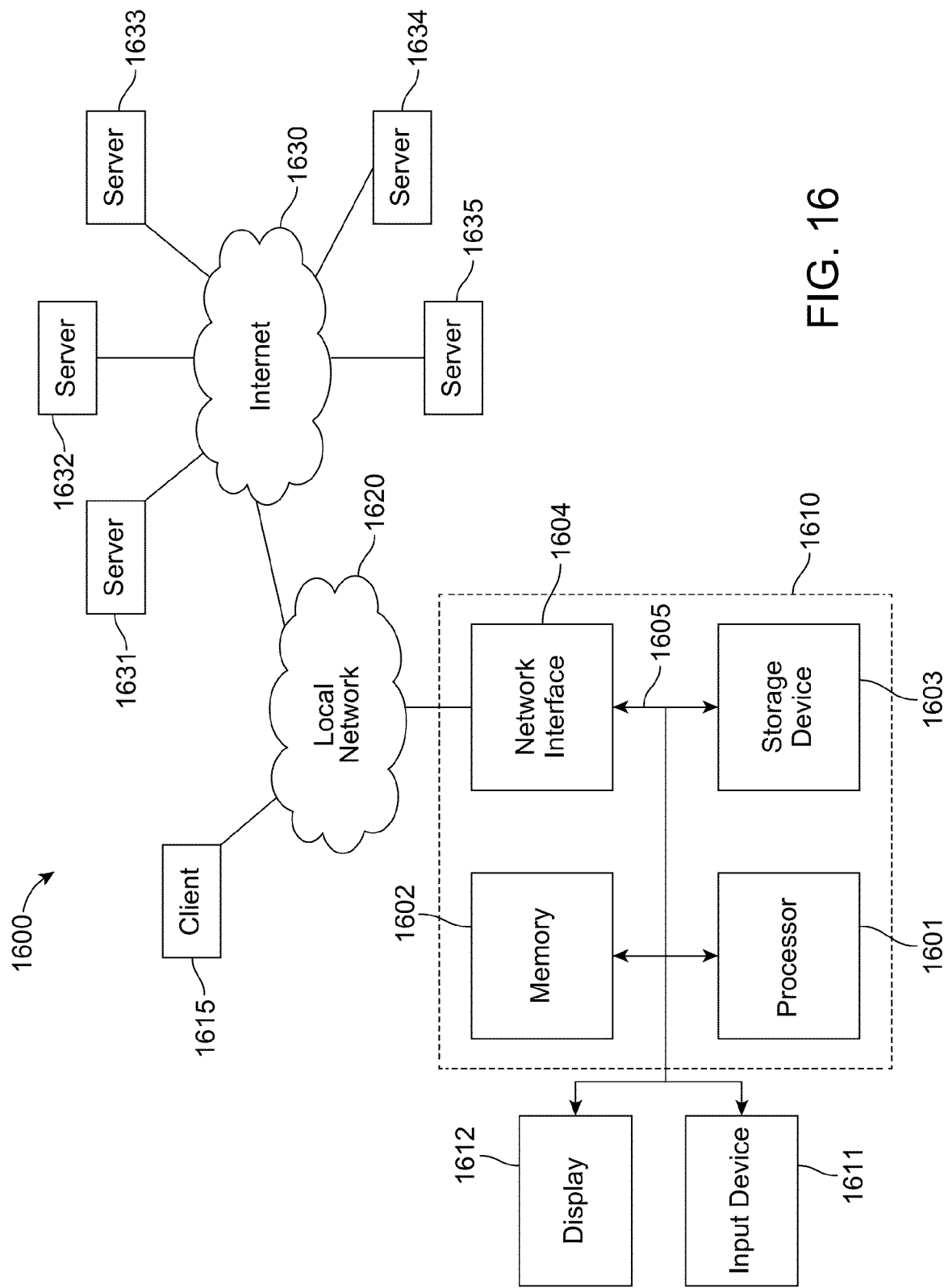
FIG. 16 illustrates an example of a computer system.

An example computer system 1610 is illustrated in FIG. 16. Computer system 1610 includes a bus 1605 or other communication mechanism for communicating information, and a processor 1601 coupled with bus 1605 for processing information. Computer system 1610 also includes a memory 1602 coupled to bus 1605 for storing information and instructions to be executed by processor 1601, including information and instructions for performing the techniques described above, for example. This memory may also be used for storing variables or other intermediate information during execution of instructions to be executed by processor 1601. Possible implementations of this memory may be, but are not limited to, random access memory (RAM), read only memory (ROM), or both. A storage device 1603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1603 may include source code, binary code, or software files for performing the techniques above, for example. Storage device and memory are both examples of computer readable mediums.

Computer system 1610 may be coupled via bus 1605 to a display 1612, such as a cathode ray tube (CRT) or liquid crystal display (LCD), for displaying information to a computer user. An input device 1611 such as a keyboard and/or mouse is coupled to bus 1605 for communicating information and command selections from the user to processor 1601. The combination of these components allows the user to communicate with the system. In some systems, bus 1605 may be divided into multiple specialized buses.

Computer system 1610 also includes a network interface 1604 coupled with bus 1605. Network interface 1604 may provide two-way data communication between computer system 1610 and the local network 1620. The network interface 1604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 1610 can send and receive information, including messages or other interface actions, through the network interface 1604 across a local network 1620, an Intranet, or the Internet 1630. For a local network, computer system 1610 may communicate with a plurality of other computer machines, such as server 1615. Accordingly, computer system 1610 and server computer systems represented by server 1615 may form a cloud computing network, which may be programmed with processes described herein. In the Internet example, software components or services may reside on multiple different computer systems 1610 or servers 1631-1635 across the network. The processes described above may be implemented on one or more servers, for example. A server 1631 may transmit actions or messages from one component, through Internet 1630, local network 1620, and network interface 604 to a component on computer system 1610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
    causing an insight analysis tool to receive from a data inference engine, an input comprising a measure/dimension combination of a dataset stored in an in-memory database;
    causing the insight analysis tool to process the input according to a master procedure comprising a sub-procedure, in order to generate an insight; and
    causing the insight to be displayed to a user.

2. A method as in claim 1 wherein:
    the input comprises a result of a user query to the in-memory database; and
    the insight analysis tool is caused to process the input during a runtime of the user query.

3. A method as in claim 2 wherein the insight analysis tool is caused to process the input according to a parameter of the user query.

4. A method as in claim 1 wherein the insight analysis tool is further configured to:
    generate a plurality of insights from the input; and
    rank the insight relative to the plurality of insights.

5. A method as in claim 1 wherein the insight analysis tool is further configured to:
    receive a plurality of measure/dimension combinations; and
    filter the plurality of measure/dimension combinations to generate the insight.

6. A method as in claim 5 wherein:
    the plurality of measure/dimension combinations comprise multiple dimensions; and
    filtering the plurality of measure/dimension combinations comprises limiting a number of insights, limiting a number of dimensions, and/or identifying unique measure/dimension combinations by disregarding an order in which dimensions occur.

7. A method as in claim 1 wherein the sub-procedure comprises outlier detection.

8. A non-transitory computer readable storage medium embodying a computer program executed on a computing device for performing a method, said method comprising:
    causing an insight analysis tool to receive from a data inference engine, an input comprising a measure/dimension combination of a dataset stored in an in-memory database;
    causing the insight analysis tool to process the input according to a master procedure comprising a sub-procedure, in order to generate an insight; and
    causing the insight to be displayed to a user.

9. A non-transitory computer readable storage medium as in claim 8 wherein:
    the input comprises a result of a user query to the in-memory database; and
    the insight analysis tool is caused to process the input during a runtime of the user query.

10. A non-transitory computer readable storage medium as in claim 9 wherein the insight analysis tool is caused to process the input according to a parameter of the user query.

11. A non-transitory computer readable storage medium as in claim 8 wherein the insight analysis tool is further configured to:
    generate a plurality of insights from the input; and
    rank the insight relative to the plurality of insights.

12. A non-transitory computer readable storage medium as in claim 8 wherein the insight analysis tool is further configured to:
    receive a plurality of measure/dimension combinations; and
    filter the plurality of measure/dimension combinations to generate the insight.

13. A non-transitory computer readable storage medium as in claim 12 wherein:
    the plurality of measure/dimension combinations comprise multiple dimensions; and
    filtering the plurality of measure/dimension combinations comprises limiting a number of insights, limiting a number of dimensions, and/or identifying unique measure/dimension combinations by disregarding an order in which dimensions occur.

14. A non-transitory computer readable storage medium as in claim 8 wherein the sub-procedure comprises outlier detection.

15. A computer system comprising:
    one or more processors;
    a software program, executable on said computer system, the software program configured to:
    cause an insight analysis tool to receive from a data inference engine, an input comprising a measure/dimension combination of a dataset stored in an in-memory database;
    cause the insight analysis tool to process the input according to a master procedure comprising a sub-procedure, in order to generate an insight; and
    cause the insight to be displayed to a user.

16. A computer system as in claim 15 wherein:
    the input comprises a result of a user query to the in-memory database; and
    the insight analysis tool is caused to process the input during a runtime of the user query.

17. A computer system as in claim 16 wherein the insight analysis tool is caused to process the input according to a parameter of the user query.

18. A computer system as in claim 15 wherein the insight analysis tool is further configured to:
    generate a plurality of insights from the input; and
    rank the insight relative to the plurality of insights.

19. A computer system as in claim 15 wherein the insight analysis tool is further configured to:
    receive a plurality of measure/dimension combinations; and
    filter the plurality of measure/dimension combinations to generate the insight.

20. A computer system as in claim 19 wherein:
    the plurality of measure/dimension combinations comprise multiple dimensions; and
    filtering the plurality of measure/dimension combinations comprises limiting a number of insights, limiting a number of dimensions, and/or identifying unique measure/dimension combinations by disregarding an order in which dimensions occur.

* * * * *